United States Patent [19]
Gehret

[11] Patent Number: 5,572,825
[45] Date of Patent: Nov. 12, 1996

[54] GLUE TRAP

[75] Inventor: Michael J. Gehret, Lititz, Pa.

[73] Assignee: Woodstream Corporation, Lititz, Pa.

[21] Appl. No.: 377,264

[22] Filed: Jan. 24, 1995

[51] Int. Cl.$^6$ .................................................. A01M 1/14
[52] U.S. Cl. .................................... 43/114; 229/120.011
[58] Field of Search ............................... 43/114, 58, 121, 43/107, 124, 131, 132.1; 229/120.011, 190, 235, 121, 242, 162

[56] References Cited

U.S. PATENT DOCUMENTS

| | | | |
|---|---|---|---|
| 549,064 | 10/1895 | Gay | 229/190 |
| 827,006 | 7/1906 | Gathmann et al. | 43/115 |
| 1,470,397 | 10/1923 | Smith | 229/190 |
| 2,962,836 | 12/1960 | Hughes | 43/114 |
| 3,023,539 | 3/1962 | Emerson, Jr. | 43/114 |
| 3,025,630 | 3/1962 | Silvey | 43/131 |
| 3,070,495 | 12/1962 | Esenther et al. | 424/9.1 |
| 3,352,053 | 11/1967 | Anderson | 43/131 |
| 3,750,326 | 8/1973 | Haubtmann | 43/131 |
| 3,913,259 | 10/1975 | Nishimura et al. | 43/114 |
| 4,208,828 | 6/1980 | Hall et al. | 43/114 |
| 4,228,945 | 10/1980 | Wysocki | 229/120.11 |
| 4,263,740 | 4/1981 | Hemsarth et al. | 43/114 |
| 4,337,592 | 7/1982 | Hasegawa | 42/113 |
| 4,395,842 | 8/1983 | Margulies | 43/114 |
| 4,608,774 | 9/1986 | Sherman | 43/114 |
| 4,800,671 | 1/1989 | Olson | 43/114 X |
| 4,815,231 | 3/1989 | McQueen | 43/114 |
| 4,818,341 | 4/1989 | Degen et al. | 162/168.2 |
| 5,022,180 | 7/1991 | Albanese | 43/114 |
| 5,141,744 | 8/1992 | Chang et al. | 424/93 |
| 5,238,681 | 8/1993 | Chang et al. | 43/114 X |
| 5,253,450 | 10/1993 | Muramatsu | 43/121 X |
| 5,258,176 | 11/1993 | Keenan | 43/133 X |
| 5,271,179 | 12/1993 | Cohen | 43/131 |
| 5,296,220 | 3/1994 | Roelofs et al. | 424/84 |

FOREIGN PATENT DOCUMENTS

| | | | |
|---|---|---|---|
| 57-102133 | 6/1982 | Japan | 43/114 |

OTHER PUBLICATIONS

J. of Economic Entomology vol. 70; No. 1, May 14, 1976; M. K. Rust and D. A. Reierson pp. 34–38 entitled "Using Phenomone Exhaust to Reduce Repellency of Blaticides".

Scientific American, Jul. 1994, p. 101 entitled "Roach Wars—Diabolical Additions to the Blatticidal Arsenal".

Environmental Entomololgy vol. 13, No. 2, 1984, pp. 448–450, Bell et al entitled "Attraction of American Cockroaches (Orthoptera: Blattidae) to Traps Containing Periplanone B and to Insecticide-Periplanone B Mixtures".

Ann. Rev. Entomol. 1990. 35:521–5 C. Schal and R. L. Hamilton entitled "Integrated Suppression of Synanthropic Cockroaches".

(List continued on next page.)

Primary Examiner—J. Elpel
Attorney, Agent, or Firm—Jacobson, Price, Holman & Stern, PLLC

[57] ABSTRACT

A glue trap for trapping vermin, such as insects, rodents and the like. In particular, a glue trap for trapping cockroaches, having a design which significantly enhances the number of cockroaches which are caught. The glue trap is designed for use specifically in target areas such as corner locations and confined spaces which are regions frequented by cockroaches, and has a unique right angled corner portion and a top opening in the corner substantially above the glue surface. A three-dimensional trap with top and side openings is provided through which vermin may access the trap interior. The trap may include an attractant to entice cockroaches and provides a slippery surface and/or substantially smooth interior surfaces juxtaposed to the adhesive so that once a cockroach is caught on the adhesive it is unable to use either a surrounding surface or edge to pull itself free. The trap and packages of at least two traps which are easily split apart by a perforation line with or without a tear-away strip and/or bendable flaps, can be formed from an integral blank of foldable sheet material.

86 Claims, 2 Drawing Sheets

OTHER PUBLICATIONS

J. of the Kansas Entomological Society, vol. 55, No. 1, 1982, pp. 86–90 entitled "The Effect of Selected Baits on the Efficacy of a Sticky Trap in the Evaluation of German Cockroach Populations".

Dissestation submitted to Temple University Graduate Board, Michael Gehret entitled "Enhancement of the Efficacy of Entomopathogenic Nematodes For Control of the Eastern Subterranean Termite, Western Corn Rootworm, and the German Cockroach".

GLUE TRAP

BACKGROUND OF THE INVENTION

The present invention relates to glue traps for trapping vermin, such as insects, rodents and the like. Particularly, the glue trap of this invention is directed toward trapping cockroaches, which are known dwellers of dark, confined spaces and known carriers of various pathogenic bacteria, viruses, protozoa and parasitic worms.

It is generally known that cockroach populations are becoming more and more difficult to control. It would seem as though the cockroach has familiarized itself with the many existing traps, whether they are adhesive traps, traps supporting various baits and insecticides or other methods of trapping and thus the need has arisen for a trap that is more effective than the existing traps known in the art in order to more successfully combat this modern day pest.

In considering characteristics endemic to cockroaches, as well as the behavior of the cockroach as they approach, enter and try and escape from a trap, the inventor has come up with a trap design which is particularly desirable for trapping cockroaches, which includes a number of features which together provide a glue trap which is surprisingly effective and out catches other known traps in the market.

Glue traps, in general, are well known. Traps known in the art each provide various ways of enhancing the catch of target vermin, whether they are cockroaches, rodents or the like. There are glue traps having various ports, entrances and openings each positioned or designed to entice or fool the vermin into entering the trap, where once it has entered, they are then prevented in various ways from escaping.

The glue trap of the present invention is provided with a unique corner design so that the trap can be positioned in a corner location for trapping cockroaches and other like crawling insects which aggregate in corner regions and confined spaces. For this reason, the trap of the present invention has been designed to locate in areas most likely favored by cockroaches, such as in corner areas of a room, a cupboard, a drawer and/or the like and is provided, inter alia, with a top opening at the corner so that a cockroach crawling down or along the walls of a corner might be caught.

Various traps known in the art are provided with features to propel the likes of an insect into a trap for engagement with an adhesive or other means of preventing the insect from escaping. In Sherman, U.S. Pat. No. 4,608,774 a roach trap having an opening or a chute and a recess for retaining an attractant to induce a roach to enter the chute is provided. The chute is provided with a slippery surface so as to enhance the downward travel of the insect into the trap once the insect is on the chute. In Hemsarth et al, U.S. Pat. No. 4,263,740, which relates to a crawling insect trap having an opening with an inwardly sloping decline, a surface covered with a loosely adhering particulate material which avalanches when the insect tries to crawl out of the opening of the trap is provided in this trap, the insect is propelled into the trap so as to become adhered to the glue surface below the opening.

In the present invention, this concept is taken further, namely by providing a slippery or low friction surface around the periphery of the glue to prevent, for example, a roach already adhered to the glue from obtaining a hold on adjacent surfaces with its available appendages, in order to break free from its engagement with the glue. In other words, rather than propelling the insect into the glue, the slippery surface acts as a means for preventing the insect escaping from engagement with the glue.

To further enhance this aspect of the present invention, the packaging and folding of the trap provides a ridge-free interior so that, for example, an insect is not able to use an edge or join to pull itself free from the glue.

It has been surprisingly discovered that the use of release paper as a means for providing such a slippery surface additionally provides a suitable surface to hold the adhesive layer in position, preventing bleeding of the adhesive throughout the trap and allowing the adhesive to be strategically placed on the surface of the trap.

Various ways of attracting vermin to glue traps are known. The type of attractant used is often specific to the type of vermin being targeted by the trap. For example, decayed wood extracts are known as attractants for termites as seen in U.S. Pat. No. 3,070,495 (Esenther et al.). The use of pheromones in pest control is also well known, especially in control of insect populations, whereby insect pheromones are used as attractants based on the understanding of both the insect's behavior and ecology.

Of particular interest in one aspect of the present invention are aggregation pheromones since these are widespread in insects, some cockroaches and many beetles and release behavior in conspecifics leading to an increase in population densities in the area of the source.

There are, however, many difficulties associated with the use of insect pheromones, particularly aggregation pheromone. These difficulties include the identification and characterization of the pheromone, for example aggregation pheromone of the cockroach species, *Blattella germanica* is documented to contain at least 150 different compounds. Furthermore there are difficulties in maintaining the stability of such volatile pheromones.

In a dissertation, authored by the inventor of the present invention, entitled "Enhancement of the Efficacy of Entomopathogenic Nematodes for the Control of the Eastern Subterranean Termite, Western Corn Rootworm and the German Cockroach", submitted to Temple University in partial fulfillment of the requirements for the degree of Doctor of Philosophy in January 1994, incorporated herein in its entirety by reference, a way to successfully collect and use natural pheromone from cockroaches of the species *Blatella Germanica*, as an attractant is documented.

A cockroach attractant causing aggregational behavior within groups of cockroaches was first reported to be associated with the feces of the German Cockroach by Ishii and Kuwahara [1968]. In Ballard and Gold, Journal of The Kansas Entomological Society 51[1], 1982, pp. 86–90, the use of German cockroach feces was used as a selected bait in a sticky trap in the evaluation of the German cockroach population. Other examples of attractants, specifically attractant baits for cockroaches of the species *B germanica* known in the art include bread, yeast, banana, dog food, apple, raisins and potato.

SUMMARY OF THE INVENTION

It is an object of the present invention to provide a glue trap suitable for use in a corner location having at least a top opening.

It is a further object of the present invention to provide a glue trap having a combination of features which together provide a suitable and more effective trap for attracting and catching cockroaches.

In one aspect of the present invention a glue trap package is provided comprising a pair of glue traps for trapping vermin and the like, wherein the package has an integral connection between the pair of traps defined by a perforation line or tear-away strip facilitaing separation of the traps.

In yet another aspect of the present invention, a glue trap for trapping cockroaches and the like is provided having, at least in an area surrounding the glue, a slippery surface to preclude a cockroach once caught on the glue, from breaking free.

In a further embodiment of the present invention, a glue trap for trapping vermin and the like is provided wherein the trap has inner surfaces which are substantially ridge-free.

In another embodiment of the present invention, a three-dimensional glue trap for trapping vermin and the like is provided in the form of an open ended box-like structure, wherein a further opening or access is provided in a top region of the box-like structure, and in a side wall of the box-like structure, through which the vermin can enter the glue trap.

In a further embodiment of the present invention, a blank for forming a glue trap package according to the invention as described above is provided.

Additional features and advantages of the invention will become apparent from the ensuing description and claims read in conjunction with the attached drawings.

BRIEF DESCRIPTION OF THE INVENTION

DESCRIPTION OF PREFERRED EMBODIMENTS

Figures 1, 2, 3, 4:
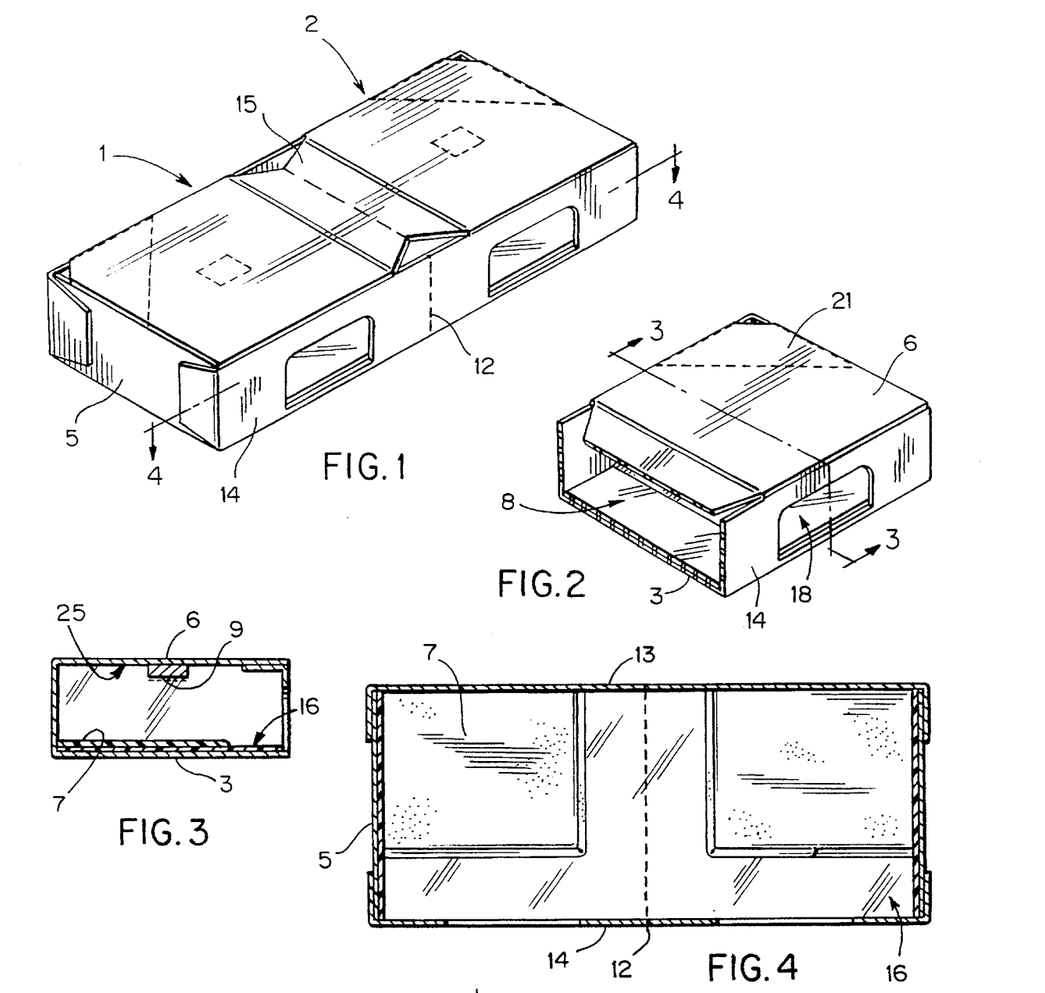
FIG. 1 is a perspective view of a glue trap package, according to one embodiment of the present invention, having a flap arrangement for tear-away separation of the trap.
FIG. 2 is a perspective view of a single glue trap according to the package of FIG. 1.
FIG. 3 is a transverse cross-sectional of a trap taken along lines 3—3 of FIG. 2.
FIG. 4 is a longitudinal cross sectional view of the trap package taken along lines 4—4 of FIG. 1.
Figures 1A, 6:
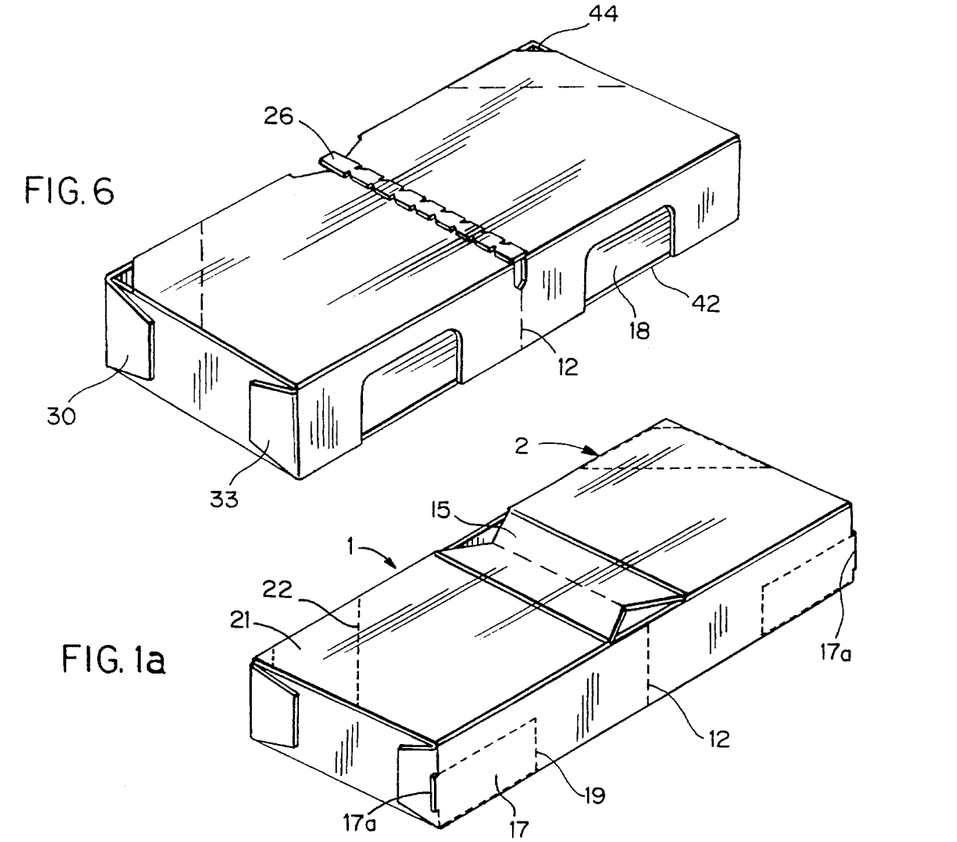
FIG. 1a is a perspective view of a glue trap package according to another embodiment of the present invention.
FIG. 6 is a perspective view of a glue trap package, according to a further embodiment of the present invention, having a paper zipper.
Figure 7:
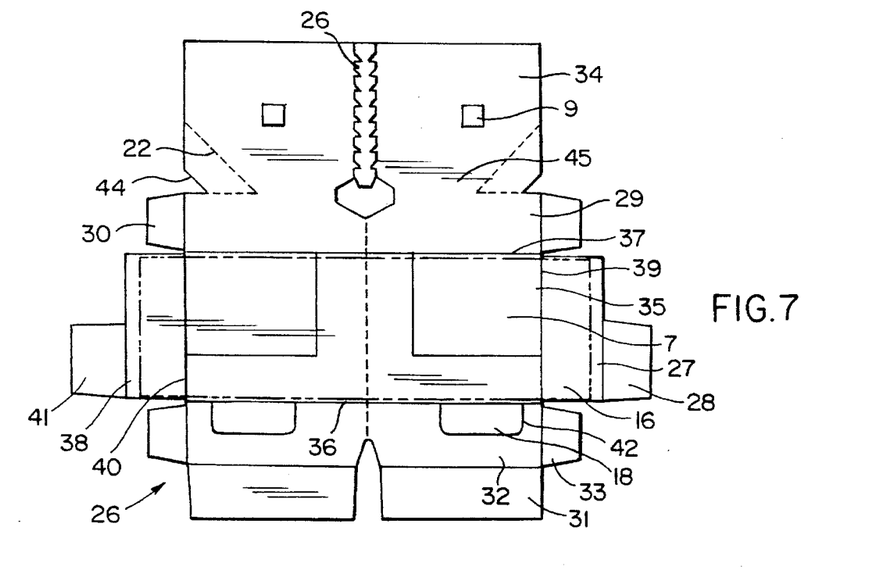
FIG. 7 is a plan view of a paperboard blank for folding into the glue trap package shown in FIG. 6.

Referring to FIG. 1, a glue trap package is shown comprising two traps, a first trap 1, and a second trap 2, integrally connected by a tear-away perforation line 12. In order to break the perforation 12 and hence separate the traps 1 and 2, according to one aspect of the invention the package is provided with a pair of top flaps 15 in a region along the perforation line 12. By pressing or bending the flaps 15 down the flaps 15 are torn apart at the perforation line 12 so that through further pulling, tear away separation of the traps 1 and 2 is more easily acquired. In the most preferred form of the present invention a paper zipper or tear-away strip 26 is provided as shown in FIGS. 6 and 7.

The glue trap package of the present invention when pulled apart provides two traps, a glue trap 1 and 2, each shaped in the form of a box-like structure having a base 3, a pair of side walls, a first side wall 14 and a second side wall 13, an end wall 5, a top 6, and an open end 8 opposite the end wall 5, the region where the traps 1 and 2 were integrally connected.

As seen in FIGS. 3 and 4 a layer of adhesive 7 is formed on an inner surface of the base 3. The adhesive 7 is a non-drying adhesive typically used in glue traps for trapping insects and the like. It is envisaged that different degrees of "tack" would be used depending on the strength required and the kind of vermin being caught. In a preferred embodiment of the present invention a slippery surface provided by a low friction liner 16 or similar is on the inner surface of the base 3, at least in a region proximal to the layer of adhesive 7. The low friction liner 16 provides about a ¾ inch border along at least the side of the adhesive 7 nearest the first side wall 14 and the open end 8 of the trap 1.

In known glue traps, the adhesive is merely relied upon to both catch and hold the vermin. Often, however, the vermin is able to free itself from the adhesive by contacting and grasping a surface proximal to the adhesive thereby forming a hold with that surface and consequently freeing itself from engagement with the glue. It has been found that, by providing a slippery surface, for example, by way of the low friction liner 16 at least surrounding the adhesive 7, the ability to pull free from the adhesive, is substantially reduced.

In the present invention, the low friction liner 16 is preferably a layer of release paper or the like, although other means for providing a slippery surface might also be used. This type of paper, typically silicone coated, is otherwise commonly used as a protective cover for adhesives to prevent unwanted adhesions. It has been surprisingly found that such release paper is not only suitable as a substantially low friction liner 16, capable of providing a "slippery" surface, but also provides a suitable surface for the adherence of the glue forming the adhesive layer 7, holding the adhesive in a desired position. The type of release paper or liner contemplated for such use, as already discussed, would be silicone coated and is preferably selected from either a platinum catalyzed release liner or a tin catalyzed release liner, although it should be realized that any similar liners could be used. Both of these liners have a very low release level depending on the amount of silicone used. The most preferred release paper has a friction index of 30 grams.

Additionally the inner surfaces juxtaposed to the adhesive layer 7 of the trap 1 generally are "ridge-free". In other words, and as will become clearer when the folded blank 46 is discussed in detail, the inner surfaces are substantially smooth, the trap 1 being constructed or folded in such a manner that the inner surfaces juxtaposed to the adhesive layer 7 have a reduced number of edges. Again this is designed to reduce the possibility of the cockroach or the like freeing itself from the adhesive by grasping an edge or surface.

Figure 5:
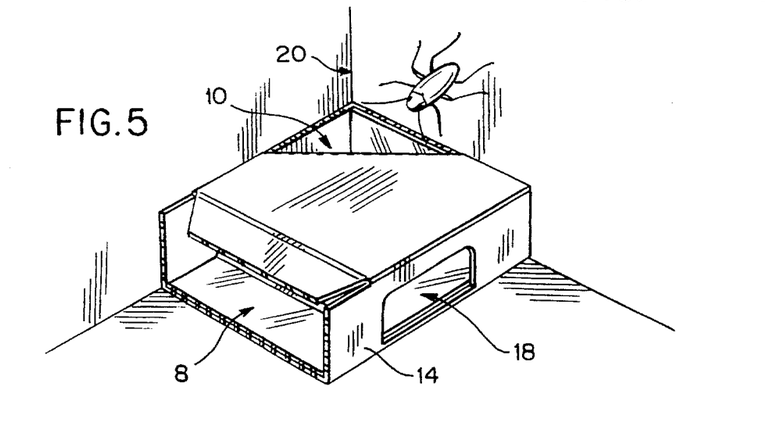
FIG. 5 is a perspective view of a single trap positioned in a corner location according to one aspect of the present invention.

In FIG. 5 it is seen that the trap 1 according to one embodiment of the present invention is suitable for use in a corner location 20. The trap 1 is provided with a right angled corner portion formed between the end wall 5 and the second side wall 13, allowing the trap to be fitted or positioned adjacent walls of the corner location 20, in particular such that the walls 13 and 5 of the trap are contiguous with the walls of the corner 20. The right angled corner portion of the trap is provided with a top opening 10. A top corner removable section 21 as seen in FIG. 2, which when removed creates a top opening 10 can be provided or the opening can be precut (not shown). The top opening 10 would preferably be positioned over the adhesive layer 7, such that the insect or the like, either crawling down the walls of corner 20 and/or walls 5, 13 of the trap, will unsuspectingly come into contact with the adhesive 7 or crawling along the outer surface of the top 6 will fall through the top opening 10 and land with force into the adhesive 7 so as to become engaged within the trap 1.

In a further embodiment of the present invention, as illustrated in FIG. 5, a three dimensional trap is provided having an open end 8, a side opening 18 provided in the first side wall 14 and a top opening 10 through which an insect or the like might enter the trap.

In one form of the present invention as seen in FIG. 1a, each of traps 1 and 2 are activated by pulling out removable sections, provided by tear-away perforation lines 19 and 22, defining a removable side section 17 and a top corner removable section 21, which when removed provide openings 18 and 10, respectively. The removable side section 17 would preferably have a tab 17a so that the side section 17 is more easily removed.

In another form of the present invention the there are no removable sections in at least the side wall of the trap but rather side openings are provided by cut out portions 42 when the package is formed as seen in FIGS. 1 and 7. In this embodiment, it is preferred that the package is protected by a plastic film or the like (not shown in the Figures), for example formed by heat sealing a plastic film wrapped around the package. This is also required when the top opening 10 is precut.

In a further embodiment of the present invention, an attractant would preferably be used to enhance the attractability of the glue trap. There are many attractants known in the art and depending on the type of vermin being trapped, any attractant could be used. In one embodiment of the present invention, natural aggregation pheromone collected from cockroaches of the species *Blatella germanica* is used to attract cockroaches of the same species to the glue trap. Preferably a cellulose matrix would be used to both collect and carry the pheromone although any carrier charged with the pheromone could be used. Useful materials include wooden chips or shavings or the like, filter paper, or cardboard. It has been surprisingly found that wooden chips of the Eastern White Pine variety in particular provide a stable attractant when charged or impregnated with the pheromone. It is envisaged that the wooden chip 9 charged with the pheromone would be affixed to a surface of the trap, preferably the top inner surface 25 as shown in FIGS. 1 and 3.

The glue trap package would be formed from panels of a folded blank 46. The blank 46 is preferably made of flexible materials. Examples of materials used are recycled paper board, and preferably, solid unbleached sulfate (S.U.S) paper board. The S.U.S paperboard, being unbleached, presents a darkened inside of the trap. With other materials, at least one side, preferably the side forming the inner surfaces of the trap 1 when constructed, can be darkened. This is desirable for trapping cockroaches since they tend to dwell in dark environments.

With reference to FIG. 7, a blank having a first side wall panel 32, a base panel 35, a second side wall panel 29 and a top panel 34 each forming respectively, first side wall 14, base 3, second side wall 13 and top 6 of traps 1 and 2.

The blank is halved by a substantially linear, transverse, perforation line 12, such that when the blank 46 is folded into the trap package of the present invention seen in FIGS. 1 and 7, the perforation line 12 forms an integral connection between traps 1 and 2.

Each half of the first side wall panel 32 is provided with an inner top portion 31 and an outer end portion 33. The first side wall panel 32 is divided from and integrally connected to the base panel 35 through a first fold line 36 which runs substantially perpendicular to the transverse perforation line 12 along the entire length of the base 3 when the trap is formed. The first fold line 36 permits the first side wall panel 32 to be bent up and at right angles to the base panel 35 thus forming, the first side wall 14 for each of traps 1 and 2.

Depending from one end of the base panel 35 is a first end wall panel 27 having a first inner top portion 28, and at the other end, a second end wall panel 38, having a second inner top portion 41. The first end wall panel 27 is integrally connected to the base panel 35 through a first end fold line 39, while the second end panel is connected to the base panel 35 through a second end fold line 40. The first and second end fold lines 39 and 40 run substantially parallel to the transverse perforation line 12 and permit the respective end wall panels 27 and 38 to be bent upwards and at right angles to the base panel 35 thus forming the end wall 5 for each of traps 1 and 2.

A second side wall panel 29 depends from and is integrally connected to the opposite side of the base panel 35 through a second fold line 37, which runs substantially parallel to the first fold line 36 of the first side wall panel 32. This second fold line 37 permits the second side wall panel 29 to be bent up and at right angles to the base panel 35 providing the second side wall 13 of each of the traps 1 and 2. The second side wall panel 29 has on each of its halves, an outer end portion 30 similar to the outer end portion 33 on each half of the first side wall panel 32.

The second side wall panel 29 is integrally connected to a top panel 34 through a top fold line 45 which runs substantially parallel to the first and second fold lines 36 and 37. When the second side wall panel 29 is bent up forming the second side wall of each of the traps 1 and 2 the top panel 34 is bent at right angles to the second side wall panel 29, through top fold line 45, toward the first side wall 14 and is substantially parallel to the base panel 35. Thus a top 6 for each of the traps 1 and 2 is provided.

To form the package of the present invention, after the blank 46 has been folded as hereinbefore described, the outer end portions 30 and 33 of the first and second side wall panels 32 and 29, respectively, are folded over and adhered to the outer surface of the first and second end wall panels 27 and 38, which when bent form the end walls 5. The inner top portions 28 and 41 on each of the first and second end wall panels 27 and 38 respectively are likewise folded over and adhered to an inside surface of the top panel 34 which forms an inner top surface 25 of the trap. The inner top portions 31 of the first side wall panel 32 are folded over and adhered to the inner top surface 25 of the top panel 34. It can therefore be seen that the number of edges on the inside surface of the trap are minimized giving the trap its ridge-free feature. The portions being adhered to the inner surfaces of the traps 1 and 2 are only adhered to the top panel 34 to achieve this. The edges are found only on the top 6 of the traps, away from the glue.

In the present invention it is preferred that the first side wall panel 32 as seen in FIGS. 6 and 7 is provided with cut out portions 42 creating the side openings 18; however, a tear-away removable side section 17 could be provided as shown in FIG. 1a. Similarly the top panel 34 could be provided with a cut out (not shown) creating the top opening 10; however, tear-away removable corner section 21 could also be provided. If a tear-away corner section 21 is provided, as shown in FIG. 6, a cut-out 44 is preferably provided so that the removable section 21 is more easily removed. In other words the top opening 10 and side opening 18 could both be cut out of the blank prior to assembling the trap so that no removable sections are required.

The low friction liner 16 is adhered to the base panel 35 of the blank 46 in any manner although it is most preferably adhered by hot glue melt techniques well known in the art. The liner 16 is also preferably adhered to the end wall panels 27 and 38 so that when the traps 1 and 2 are formed the "slippery" surface surrounds at least three sides of the adhesive layer 7. As already discussed, the type of liner 16 preferred is silicone release paper.

The dimensions for the folded trap package is preferably 2½×6×1 inches (width×length×height) which when split in use provides two traps of dimensions 2½×3×1 inches (width×length×height). However, this would vary depending on the type of vermin being caught; the above dimensions have been found to be most suited for catching cockroaches which aggregate in corner locations.

Thus, it is evident that the invention provides a trap which has a number of features which together provide a trap which is surprisingly more effective than other commercially available traps as further evidenced by the following comparative table.

EXAMPLE 1

A tank 2.5×1.0×1.0 feet (length×width×height) was covered with a white bedding sheet to allow the air to circulate within and through the tank. A food source was provided such as laboratory chow and a paper towel with water on it and positioned in the middle of the tank.

A cockroach shelter or nest housing approximately 30 cockroaches (2.5 g) was provided in the form of a 500 ml plastic beaker or cup with a wet paper towel and covered with a lid for one week. By placing the roaches into the beaker they were able to become established in this environment. At the end of one week the lid was removed and the shelter was carefully placed in the middle of the tank. This type of procedure closely simulates a roach infested environment in the field. At this point a trap was placed at each end of the tank. At one end a trap according to the present invention was placed and at the other being a competitive trap. Thus tests consist of two-choice competitive trials each replicated three times. The type of sticky or glue trap was randomized to prevent the possibility of the roaches orienting toward a particular side of the tank.

The results were calculated as the number of roaches stuck and hence caught in the traps after a period of one week and determined as a percentage of the total number of roaches introduced into the tank.
RESULTS

TABLE 1

| TANK TEST | PERCENTAGE OF ROACHES CAUGHT IN EACH TRAP |
|---|---|
| 1. Competitor #1 | 18.0 |
| vs | |
| Invention | 82.0 |
| 2. Competitor #2 | 14.8 |
| vs | |
| Invention | 85.2 |
| 3. Competitor #3 | 22.5 |
| vs | |
| Invention | 77.5 |
| 4. Competitor #4 | 33.0 |
| vs | |
| Invention | 67.0 |

Discussion of Results

The traps of the present invention were found to capture an approximate average of 3–4 times as many roaches as the competitor traps.

It is therefore apparent that the glue trap of the present invention, especially having, in combination, a frictionless border around the area proximal to the glue and a stable attractant, together with other features hereinbefore described, is far superior to glue traps presently available in the market.

EXAMPLE 2

The effectiveness of using a slippery surface proximal to the adhesive in a glue trap was tested. Twenty-five cockroaches were placed in a cup (volume approximately 100 ml) and allowed to acclimate for a period of approximately 5 minutes. The cup was then placed into a container, approximately 9 inches by 5 inches (length by width). A glue trap was then positioned on one side of the container. The first glue trap or control trap had an adhesive layer measuring 1.5 inches in length and width. The glue was surrounded by a 1.0 inch border of cardboard to provide a uniform edge on all sides of the adhesive layer. After 5 minutes the cockroaches were released from the cup into the container. The number of cockroaches retained on the adhesive were then calculated.

A second glue trap, identical to the first trap, except for having a slippery surface bordering the adhesive layer, was then tested under the same protocol as above. Examples of ways of providing slippery surfaces include low friction liners such as silicone release paper, lubricants such as WD40, and petroleum distillates.

The above procedure was replicated five times and the results below were obtained.
Results Percentage of cockroaches retained in the first trap was 44.0±14.3%

Percentage of cockroaches retained in the second trap was 83.3±9.4%
Discussion

The use of a slippery surface proximal to the adhesive layer in a glue trap substantially increased the number of cockroaches retained on the adhesive. It is therefore concluded that cockroaches are less able to break free from the adhesive when a slippery surface borders the adhesive layer of the glue trap. While only a preferred embodiment of the invention has been hereinbefore described, the invention is not limited thereto and modifications can be made within the scope of the claims.

I claim:

1. A glue trap for trapping vermin suitable for use in a corner location comprising:

a trap housing defining an enclosure;

having a base, a pair of side walls, at least one end wall and a top wall, each of said base, said side walls, said at least one end wall and said top wall having inner and outer surfaces, respectively;

a layer of non-drying adhesive supported by at least a portion of said base within said enclosure;

a right angled corner portion defined by a portion of one of said side walls and a portion of said at least one end wall; and a top opening in said top wall juxtaposed to said corner portion and formed, at least in part, by the portion of said side wall and said at least one end wall defining said corner portion, said top opening extending, at least in part, over said layer of adhesive.

2. The glue trap of claim 1 wherein the end of said trap housing spaced from said at least one end wall defines an open end.

3. A glue trap package comprising first and second glue traps as defined in claim 2, wherein said first and second traps are integrally connected at said open ends of their respective trap housings.

4. The glue trap package of claim 3, wherein said base, side walls, at least one end wall and top wall of said trap housings of each of said first and second traps are formed from respective panels of a folded blank of flexible sheet material.

5. The glue trap package of claim 4 wherein said flexible sheet material is solid unbleached sulfate paperboard.

6. The glue trap package of claim 4 wherein the panels of said blank defining said at least one end wall of said trap housings of each of said first and second traps each comprise and inner top portion, said inner top portions being folded over and adhered to said inner surfaces of respective top walls.

7. The glue trap of claim 4 wherein the panels of said blank defining a first wall of said trap housings of each of said first and second traps each comprises an outer end portion;

the panels of said blank defining a second side wall of said trap housings of each of said first and second traps each comprises and outer end portion and an inner top portion;

said first and second outer end portions being folded over and adhered to said outer surfaces of respective at least one said end walls; and said inner top portions being folded over and adhered to said inner surfaces of respective top walls.

8. The glue trap of claim 1 wherein at least one of said walls is provided with at least one said opening.

9. The glue trap of claim 8 wherein at least one side opening is provided with a removable section defined by a tear-away perforation line.

10. The glue trap of claim 8 wherein said side opening is positioned near said at least one end wall.

11. The glue trap of claim 1 wherein said top opening has at least two sides defined by said side wall and said at least one end wall forming said corner portion, so that when said trap is placed against walls forming a corner location, said side wall and said at least one end wall of said trap are substantially contiguous with said walls of said corner.

12. The glue trap of claim 1 wherein one of said side walls forms said corner portion with said at least one end wall, the other of said side walls being provided with a side opening.

13. The glue trap of claim 12 wherein said side opening is provided with a removable section defined by a tear-away perforation line.

14. The glue trap of claim 12 wherein said at least one side opening is positioned near said end wall.

15. The glue trap of claim 1 further comprising an attractant.

16. The glue trap of claim 15 wherein said attractant is aggregation pheromone collected from cockroaches of the species *B. germanica*.

17. The glue trap of claim 16 aggregration pheromone is carried by a cellulose matrix.

18. The glue trap of claim 17 wherein said cellulose matrix is a wooden chip.

19. The glue trap of claim 18 wherein said wooden chip is made from eastern white pine.

20. The glue trap of claim 18 wherein said wooden chip is affixed to said inner surface of said top wall of said trap housing.

21. The glue trap of claim 1 wherein said inner surfaces of said base, side walls and at least one end wall juxtaposed to said layer of adhesive are substantially smooth.

22. The glue trap of claim 1 wherein said inner surface are darkened.

23. A glue trap package for trapping vermin comprising:

first and second trap housings each defining an enclosure and each trap housing having a base, a pair of side walls, an end wall and a top wall, separate layers of non-drying adhesive supported by at least a portion of each of said bases within said enclosures;

the end of each said housing spaced from its respective end wall defining an open end, said trap housings being integrally connected at said open ends, and a perforation line providing tear-away separation of said first and second trap housings.

24. The glue trap package of claim 4, further including a pair of top transverse fold lines, one transverse fold line being formed along said top wall of said first trap and said other transverse fold line being formed along said top wall of said second trap, both transverse fold lines being parallel to and near said perforation line; and a pair of flaps defined by said respective fold lines, said flaps being integrally connected along said perforation line, wherein said flaps are bent downwards to break said connection.

25. The glue trap of claim 23, further including a tear-away strip associated with said perforation line for separation of respective traps.

26. A glue trap comprising:

a trap housing defining an enclosure including a base with an inner surface within said enclosure;

a layer of release paper, affixed to, and substantially covering, at least said base inner surface, said release paper having an upper surface with a low coefficient of friction as compared to said base inner surface, and providing a suitable surface for a non-drying adhesive, and an adhesive layer carried by at least a portion of said upper surface of said release paper.

27. The glue trap of claim 8 wherein said adhesive layer is carried by only a portion of said upper surface of said release paper, a further portion of said upper layer of said release paper at least partially surrounding said adhesive layer and having a reduced coefficient of friction as compared to said adhesive layer.

28. The glue trap of claim 26 wherein said release paper is silicone coated.

29. The glue trap of claim 26 wherein said trap housing further includes opposed side walls and at least one end wall each of which has an inner surface, said release paper further substantially covers said inner surface of said at least one end wall.

30. A glue trap for trapping vermin suitable for use in a corner location comprising:

a trap housing defining an enclosure having a base, a pair of side walls, at least one end wall and a top wall, each of said base, said side walls, said at least one end wall and said top wall having inner and outer surfaces, respectively;

a layer of non-drying adhesive supported by at least a portion of said base within said enclosure;

a right angled corner portion defined by a portion of one of said side walls and a portion of said at least one end wall; and a top opening in said top wall juxtaposed to said corner portion, said top opening being provided with a removable corner section.

31. The glue trap of claim 30 wherein said removable corner section is defined by a tear-away perforation line.

32. A glue trap package comprising first and second glue traps for trapping vermin, each trap suitable for use in a corner location and comprising:

a trap housing defining an enclosure and having a base, a pair of side walls, an end wall, a top wall and an open end, each of said base, side walls, end wall and top wall having inner and outer surfaces, respectively;

a layer of non-drying adhesive supported by at least a portion of said base within said enclosure;

a right angled corner portion having a top opening positioned above said layer of adhesive;

a side opening formed in one of said side walls;

a surface area surrounding said layer of adhesive having a reduced coefficient of friction as compared to said adhesive;

means for attracting vermin; and an integral connection between said open ends of each respective trap, said integral connection defined by a perforation line providing tear-away separation of said traps.

33. The glue trap package of claim 32 wherein said top opening is provided with a removable section defined by a tear-away perforation line.

34. The glue trap package of claim 32 wherein said side opening is provided with a removable section defined by a tear-away perforation line.

35. The glue trap package of claim 32 wherein said area of reduced surface friction substantially covers at least said base inner surface, has a reduced coefficient of friction as compared to said base inner surface, and additionally provides as suitable surface on which said adhesive layer is carried.

36. The glue trap package of claim 32 wherein said area of reduced surface fiction comprises a layer of silicone coated release paper affixed to, and at least substantially covering, said base inner surface, said release paper having an upper surface with a reduced coefficient of friction as compared to said base inner surface.

37. The glue trap package of claim 36, said release paper further substantially covering said inner surfaces of said end walls of each trap.

38. The glue trap package of claim 32 further including a pair of top transverse fold lines, one transverse fold line being formed along said top wall of said first trap and the other transverse fold line being formed along said top wall of said second trap, both transverse fold line being parallel to and near said perforation line; and a pair of flaps defined by said respective fold lines, said flaps being integrally connected along said perforation line, wherein said flaps are bent downwards to break said connection.

39. The glue trap package of claim 32 further including a tear-away strip for breaking said perforation line.

40. The glue trap package of claim 32 wherein said right angled corner portion of each trap is formed between one of said side walls and said end wall and said top opening having at least two sides at least partially defined by said one side wall and said end wall forming said corner portion, so that when said trap is placed against walls forming a corner location, said one side wall and said end wall of said trap forming said corner portion are substantially contiguous with said walls of said corner location.

41. The glue trap package of claim 40 wherein said side opening of each trap is formed in the other of side walls.

42. The glue trap package of claim 41 wherein said side opening is positioned near said end wall.

43. The glue trap package of claim 32 wherein said means for attracting vermin is aggregation pheromone collected from cockroaches of the species *B. germanica.*

44. The glue trap package of claim 43 wherein said aggregation pheromone is carried by a cellulose matrix.

45. The glue trap package of claim 44 wherein said cellulose matrix is a wooden chip.

46. The glue trap package of claim 45 wherein said wooden chip is made from eastern white pine.

47. The glue trap package of claim 45 wherein said wooden chip is affixed to said inner surface of said top wall of said strap.

48. The glue trap package of claim 32 wherein said inner surfaces of at least said base and portions of said side walls and said end wall juxtaposed to said layer of adhesive are substantially smooth.

49. The glue trap package of claim 32 said inner surfaces are darkened.

50. A three dimensional glue trap for trapping vermin comprising at least a first trap, said first trap comprising:

a trap housing defining an enclosure and having a base, a pair of side walls, at least one end wall and a top wall, each of said base, side walls, at least one end wall and top wall having inner and outer surfaces, respectively;

a layer of non-drying adhesive supported by at least a portion of said base within said enclosure;

a top opening and a side opening defined in said housing through which vermin access said glue trap; and said top opening being at least partially defined by portions of one of said side walls and said at least one end wall, and said side opening being formed in the other of side walls.

51. The glue trap of claim 50 wherein said top opening is positioned substantially above said layer of adhesive.

52. The glue trap of claim 51 wherein each of said openings comprises a removable section defined by a tear-away perforation line.

53. The glue trap of claim 50 wherein said side opening is positioned near said at least one end wall.

54. A three dimensional glue trap package for trapping vermin comprising a pair of integrally connected glue traps, each of said glue traps comprising:

a trap housing defining an enclosure and having a base, a pair of side walls, at least one end wall and a top wall, each of said base, side walls, at least one end wall and top wall having inner and outer surfaces, respectively;

a layer of non-drying adhesive supported by at least a portion of said base within said enclosure;

said top wall and one of said side walls each being provided with an opening through which vermin access said glue trap;

said inner surfaces juxtaposed to said layer of adhesive being substantially smooth; and said base, side walls and top wall of one of said pair of glue traps being integrally connected to, and separable from, said base, side walls and top wall, respectively, of the other of said pair of glue traps.

55. A glue trap package for trapping vermin comprising a pair of integrally connected glue traps, each of said glue traps comprising:

a trap housing defining an enclosure and having a base, side walls, a top wall and at least one end wall, each of said base, side walls, top wall and at least one end wall having inner and outer surfaces, respectively and being integrally formed from a single blank of flexible sheet material;

a layer of non-drying adhesive supported by at least a portion of said base within said enclosure;

said inner surfaces of at least said base, said side walls and said at least one end wall juxtaposed to said layer of adhesive being substantially smooth and free of any raised portion that would provide vermin partially caught on said adhesive layer with an edge to grasp; and said base, side walls and top wall of one of said pair of glue traps being integrally connected to, and separable from, said base, side walls and top wall, respectively, of the other of said pair of glue traps.

56. A blank for forming a pair of integrally connected separable glue traps providing a glue trap package, said blank comprising:

a base panel;

a first side wall panel having a plurality of outer end portions, said first side wall panel connected along a first side fold line to said base panel;

a second side wall panel having a plurality of outer end portions and a plurality of inner top portions, permitting said traps to be separated said second side wall panel connected along a second side fold line to said base panel opposite said first side wall panel;

a first and second end wall panel each having at least one inner top portion, said first end wall panel connected along a first end fold line to said base panel between said first and second side wall panels, said second end wall panel connected along a second end fold line to said base panel opposite said first end fold line, between said first and second side wall panels;

a top panel connected by a top fold line to said first side wall panel opposite said first side fold line;

said base, side wall, end wall and top panels each having respective inner and outer surfaces; and at least one layer of non-drying adhesive supported by at least a portion of inner surface of said base panel.

57. The blank of claim 56 wherein said blank defines two halves which are mirror images of each other, one layer of adhesive being formed on each half of said blank.

58. The blank of claim 56 wherein said blank further comprises a layer of release paper substantially covering said inner surface of at least said base panel, said layer of release paper having an upper surface with a reduced coefficient of friction as compared to said inner surface of said base and providing a suitable surface for said adhesive layer.

59. The blank of claim 58 wherein said layer of release paper further covers a substantial portion of said inner surfaces of said end wall panels.

60. The blank of claim 56 wherein said top panel is provided with a plurality of substantially triangular openings.

61. The blank of claim 56 wherein said inner surfaces are substantially darkened.

62. The blank of claim 56 further comprising display printing on said outer surfaces.

63. The blank of claim 56 such that, when folded to form said glue trap package, said inner surfaces of said first and second outer end portions adhere to said outer surface of said first and second end wall panels respectively; and said outer surfaces of said side wall and end wall panel inner top portions adhere to said inner surface of said top panel.

64. The blank of claim 56 further comprising an attractant located on at least one of said inner surfaces.

65. The blank of claim 64 wherein said attractant is aggregation pheromone collected from cockroaches of the species *B. germanica*.

66. The blank of claim 65 wherein said aggregation pheromone is carried by a cellulose matrix.

67. The blank of claim 66 wherein said cellulose matrix is a wooden chip.

68. The blank of claim 67 wherein said wooden chip is made from eastern white pine.

69. The blank of claim 56 wherein the panels are formed from flexible sheet material.

70. The blank of claim 69 wherein said flexible sheet material is solid unbleached sulfate paperboard.

71. A blank for forming a pair of integrally connected glue traps providing a glue trap package, said blank comprising:

a base panel;

a first side wall panel having a plurality of outer end portions, said first side wall panel connected along a first side fold line to said base panel, a second side wall panel having a plurality of outer end portions and a plurality of inner top portions, said second side wall panel connected along a second side fold line to said base panel opposite said first side wall panel;

a first and second end wall panel each having at least one inner top portion, said first end wall panel connected along a first end fold line to said base panel between said first and second side wall panels, said second end wall panel connected along a second end fold line to said base panel opposite said first end fold line, between said first and second side wall panels;

a top panel connected by a top fold line to said first side wall panel opposite said first side fold line;

said base, side wall, end wall and top panels each having respective inner and outer surfaces; and further including a perforation line substantially perpendicular to said top, first and second fold lines.

72. The blank of claim 60 further comprising a tear-away strip located along said perforation line to break said perforation line and separate said pair of glue traps.

73. The blank of claim 60 wherein said top panel further comprises a flap portion formed along said perforation line to break said perforation line and separate said pair of glue traps.

74. A blank for forming a pair of integrally connected glue traps providing a glue trap package, said blank comprising:

a base panel;

a first side wall panel having a plurality of outer end portions, said first side wall panel connected along a first side fold line to said base panel;

a second side wall panel having a plurality of outer end portions and a plurality of inner top portions, said second side wall panel connected along a second side fold line to said base panel opposite said first side wall panel;

a first and second end wall panel each having at least one inner top portion, said first end wall panel connected along a first end fold line to said base panel between said first and second side wall panels, said second end wall panel connected along a second end fold line to said base panel opposite said first end fold line, between said first and second side wall panels;

a top panel connected by a top fold line to said first side wall panel opposite said first side fold line;

said base, side wall, end wall and top panels each having respective inner and outer surfaces; and said first side wall panel being provided with a plurality of removable sections each defined by a substantially rectangular tear-away perforation line.

75. A blank for forming a pair of integrally connected separable glue traps providing a glue trap package, said blank comprising:

a base panel;

a first side wall panel having a plurality of outer end portions, said first side wall panel connected along a first side fold line to said base panel;

a second side wall panel having a plurality of outer end portions and a plurality of inner top portions, permitting said traps to be separated said second side wall panel connected along a second side fold line to said base panel opposite said first side wall panel;

a first and second end wall panel each having at least one inner top portion, said first end wall panel connected along a first end fold line to said base panel between said first and second side wall panels, said second end wall panel connected along a second end fold line to said base panel opposite said first end fold line, between said first and second side wall panels;

a top panel connected by a top fold line to said first side wall panel opposite said first side fold line;

said base, side wall, end wall and top panels each having respective inner and outer surfaces; and said first side wall panel being provided with a plurality of cut out portions.

76. A blank for forming a pair of integrally connected separable glue traps providing a glue trap package, said blank comprising:

a base panel;

a first side wall panel having a plurality of outer end portions, said first side wall panel connected along a first side fold line to said base panel;

a second side wall panel having a plurality of outer end portions and a plurality of inner top portions permitting said traps to be separated, said second side wall panel connected along a second side fold line to said base panel opposite said first side wall panel;

a first and second end wall panel each having at least one inner top portion, said first end wall panel connected along a first end fold line to said base panel between said first and second side wall panels, said second end wall panel connected along a second end fold line to said base panel opposite said first end fold line, between said first and second side wall panels;

a top panel connected by a top fold line to said first side wall panel opposite said first side fold line;

said base, side wall, end wall and top panels each having respective inner and outer surfaces; and said first side wall panel being provided with a substantially rectangular opening.

77. A blank for forming a pair of integrally connected glue traps providing a glue trap package, said blank comprising:

a base panel;

a first side wall panel having a plurality of outer end portions, said first side wall panel connected along a first side fold line to said base panel;

a second side wall panel having a plurality of outer end portions and a plurality of inner top portions, said second side wall panel connected along a second side fold line to said base panel opposite said first side wall panel;

a first and second end wall panel each having at least one inner top portion, said first end wall panel connected along a first end fold line to said base panel between said first and second side wall panels, said second end wall panel connected along a second end fold line to said base panel opposite said first end fold line, between said first and second side wall panels;

a top panel connected by a top fold line to said first side wall panel opposite said first side fold line;

said base, side wall, end wall and top panels each having respective inner and outer surfaces; and said top panel being provided with a plurality of removable corner sections each defined by a substantially triangular tear-away perforation line.

78. The blank of claim 71 wherein at least one side of said triangular tear-away perforation line is formed along a part of said top fold line.

79. In a glue trap for trapping vermin comprising:

a base having an upper surface;

a layer of non-drying adhesive supported by at least a portion of said upper surface of said base; and a surface area at least partially surrounding said layer of adhesive having a reduced coefficient of friction as compared with said adhesive layer so that vermin trapped on at least an edge region of said adhesive layer are unable to break free from said adhesive layer by using an adjacent surface, the improvement which comprises a layer of release paper affixed to said base surface, said layer of release paper having an upper surface with a low coefficient of friction as compared with said upper surface of said base, and said adhesive layer being carried by a portion of said upper surface of said release paper.

80. The glue trap of claim 79 wherein said release paper is silicone coated.

81. The glue trap of claim 79 further comprising an attractant.

82. The glue trap of claim 81 wherein said attractant is aggregation pheromone.

83. The glue trap of claim 82 wherein said aggregation pheromone collected from cockroaches of the species *B. germanica*.

84. The glue trap of claim 82 wherein said aggregation pheromone is carried by a cellulose matrix.

85. The glue trap of claim 84 wherein said cellulose matrix is a wooden chip.

86. The glue trap of claim 85 wherein said wooden chip is made from eastern white pine.

* * * * *